(12) United States Patent
Gazzuolo

(10) Patent No.: US 6,546,309 B1
(45) Date of Patent: Apr. 8, 2003

(54) VIRTUAL FITTING ROOM

(75) Inventor: Edith B. Gazzuolo, Crystal, MN (US)

(73) Assignee: Kinney & Lange, P.A., Minneapolis, MN (US)

( * ) Notice: Subject to any disclaimer, the term of this patent is extended or adjusted under 35 U.S.C. 154(b) by 50 days.

(21) Appl. No.: 09/896,883

(22) Filed: Jun. 29, 2001

Related U.S. Application Data

(60) Provisional application No. 60/215,026, filed on Jun. 29, 2000.

(51) Int. Cl.[7] .............................................. G06F 19/00
(52) U.S. Cl. ........................ 700/132; 33/512; 702/167; 705/26
(58) Field of Search ................................ 700/132, 130; 33/512; 705/1, 26; 702/167; 395/630

(56) References Cited

U.S. PATENT DOCUMENTS 6,246,468 B1 * 6/2001 Dimsdale ................ 702/167 X
6,415,199 B1 * 7/2002 Liebermann ................ 700/132

* cited by examiner

Primary Examiner—Peter Nerbun
(74) Attorney, Agent, or Firm—Kinney & Lange, P.A.

(57) ABSTRACT

A method for enabling a customer to virtually try on a selected garment is disclosed. First, a mathematical model of the customer's body and a garment model for the selected garment are retrieved. The garment model includes a plurality of fit factors. Next, a size of the garment that will best fit the customer is determined by comparing the fit factors of the garment model to the mathematical model of the customer's body. Finally, a fit analysis data of the selected garment in the determined size on the customer is determined for each of the fit factors by comparing each of the fit factors of the determined size garment to the mathematical model of the customer's body;

20 Claims, 11 Drawing Sheets

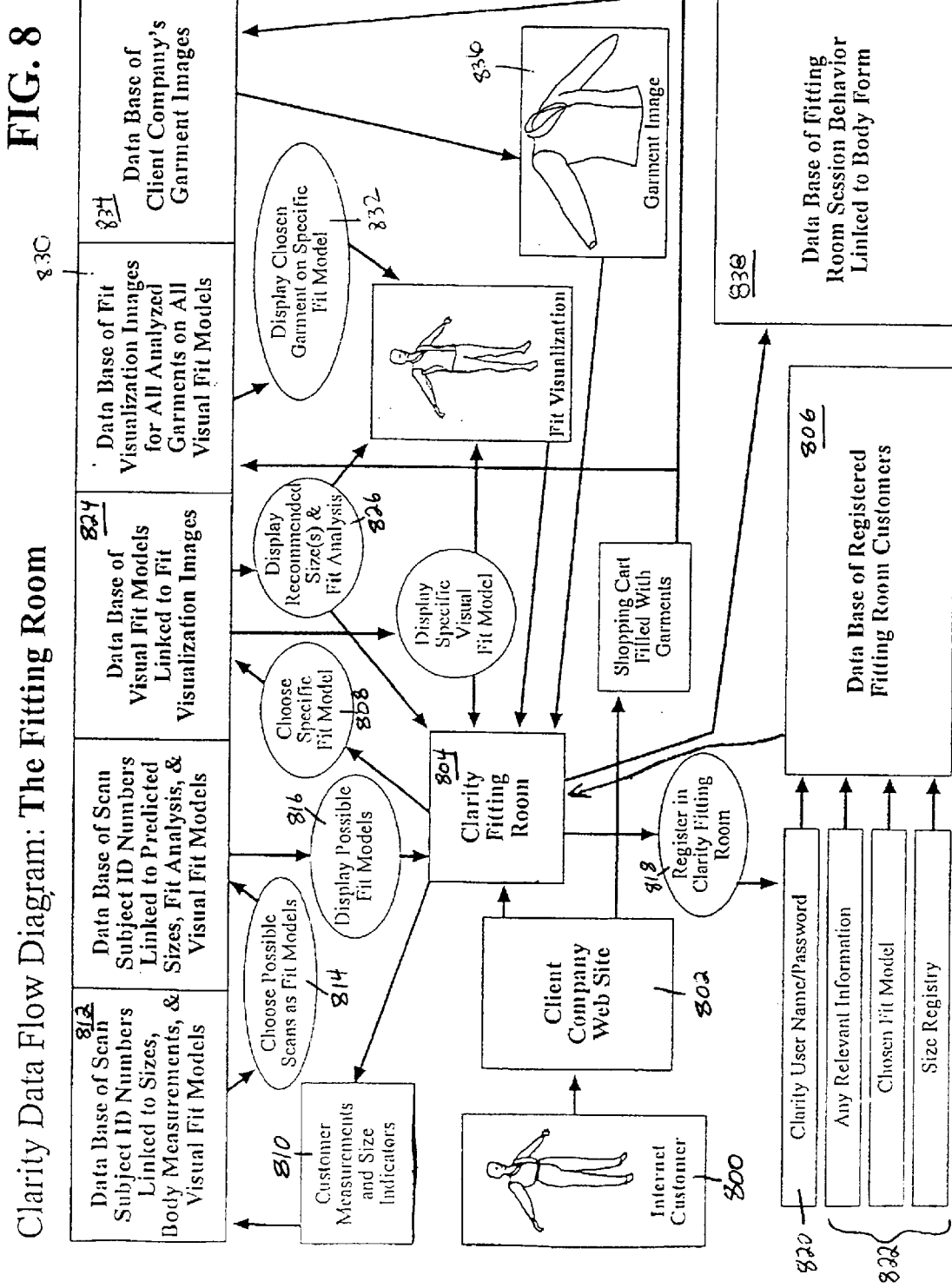
FIG. 8 Clarity Data Flow Diagram: The Fitting Room

VIRTUAL FITTING ROOM

CROSS-REFERENCE TO RELATED APPLICATION(S)

This application claims the priority from provisional U.S. patent application No. 60/215,026, filed on Jun. 29, 2000 for "Virtual Fitting Room" of Edith B. Gazzuolo.

BACKGROUND OF THE INVENTION

The present invention relates generally to the field of image processing. In particular, the present invention relates to a system and method for implementing a virtual fitting room that will provide an actual analysis of how a garment will fit a customer, and which will provide a realistic visual representation of the garment's fit on the customer.

Recent years have seen an overwhelming growth of electronic commerce in the apparel industry. One of the greatest problems plaguing both electronic apparel merchants and customers is the difficulty in determining how a garment will fit the customer. Customers are nervous about purchasing garments electronically, because they are unsure of what size to order, and how that garment will look on them. Merchants are nervous about the high volume of apparel returns. For a merchant, the handling of an apparel return can cost up to four times what it cost to process the initial sale of the apparel. Industry analysts have estimated that apparel returns for electronic merchants range from about 10% for very basic items to between 35%–40% for high end clothing. The single biggest reason for returns of apparel purchased electronically is poor fit.

For years now, the clothing industry has tried to resolve this return problem by developing "digital fitting rooms". These digital fitting rooms have varied in function, but generally involve the following features. The system receives a user's basic measurements (generally height, bust, waist, hip, arm length, and inseam). The system then generates a computer model having those basic proportions, sometimes attaching a photograph of the user's face to the computer model. Once a garment is selected to be digitally tried on, a two-dimensional representation of the garment is morphed to fit the model. The morphed representation is then superimposed on the model to allow the customer to view a rough estimation of how a particular garment will fit. With these systems, no matter what the shape of the model, the garments "magically" adjust to fit the model, thus failing to realistically answer the question of actual garment fit.

Thus, there is a need for virtual fitting room software that will provide an actual analysis of how a garment will fit a customer, and which will provide a realistic visual representation of a garment's fit on a customer.

BRIEF SUMMARY OF THE INVENTION

The present invention is a system and method for implementing a virtual fitting room that enables accurate size prediction and analysis of fit of a garment on a user. In a first alternate embodiment of the present invention, several preprocessing steps are performed to initialize and develop a plurality of databases. In a second alternate embodiment of the present invention, some or all of these preprocessing steps are performed "on the fly".

First, a database of body scan fit models is developed to enable both scanned and unscanned users to virtually "try-on" clothing in the virtual fitting room of the present invention. Additionally, a database of visual fit models is created to allow users to visualize the fit of the garments on themselves. Each of the visual fit models is linked to at least one body scan fit model. To minimize storage space, body scan fit models having similar body configurations may share a common visual fit model. Preferably, each visual fit model is also created with several different skin tones and hairstyles. A database of garment models is also created during these preprocessing steps. A visualization designer will review information such as a manufacturer's garment specifications, grading rules, sizing information, fit model, and fit of the actual garments on the fit model to develop garment models for each of the garments available for "virtual try-on".

Once the databases of body scan fit models, visual fit models and garment models are created, a database of size predictions, fit analysis, and fit visualizations is created. Each body scan fit model is then analyzed in comparison to each garment model to predict the proper size(s). If multiple sizes each offer some degree of "fit", the system will allow the user to see herself in multiple sizes. If a size is available in that garment for that user, a fit analysis is performed of the body scan fit model in the selected size, as well as one size up and down, of the garment. Finally, fit visualization images are created to allow for subsequent visualization.

Once the body scan fit models and garment models have been determined, the virtual fitting room functions can be accessed. The virtual fitting room performs the functions of size prediction, fit analysis and fit visualization. Finally, information gleamed from the development of a database of body scan fit models and from a multitude of visits to the virtual fitting room can lead to data mining, which is useful for size development, size scaling and manufacturer specific inquiries.

The virtual fitting room preferably operates in an Internet environment, although it is equally usable in desktop computer or PDA format. In a preferred embodiment of the virtual fitting room of the present invention, a user, prior to entering the virtual fitting room of the present invention, visits a participating manufacturer's web site to select the clothing she would like to virtually "try-on". The user's selected garments are placed in a virtual "shopping cart". Once the user has selected all of the garments she would like to try-on, she brings her shopping basket into the virtual fitting room by selecting a button on the manufacturer's web site. At this point, there are three options depending on the user's status as: (a) previously registered and personally scanned; (b) previously registered but not personally scanned; or (c) neither previously registered nor personally scanned.

If the user has been previously registered and personally scanned, the user enters her personal identification number to have her personal body scan and visual fit models retrieved. If the user has not been previously scanned, but has been previously registered, the user enters her personal identification number to have her previously-selected body scan and visual fit models retrieved.

Finally, if the user has neither been previously scanned nor registered, the user enters her sizing information and/or body measurements. Sizing information may include such information as what size she wears in a particular manufacturer's clothing. The sizing information and/or body measurements will be analyzed to select a visual fit model. Alternatively, the sizing information and/or body measurements will be analyzed to narrow the number of potential visual fit models to about 3 to about 6 visual fit models which are presented to the user for her selection of the visual fit model that most closely approximates her body configuration and posture. If she registers with the virtual fitting room, she can later retrieve the same visual fit model for future visits to the fitting room.

Once presented with a visual fit model, the customer selects which of the garments brought with her to the virtual fitting room she would like to "virtually try-on". In the first alternate embodiment of the present invention, the recommended size of the garment for the user, the fit analysis of that size garment on the user (as well as one size up and down), and the fit visualization of the garment in the three sizes on the user have all been preprocessed. Thus, the preprocessed size prediction, fit analysis and fit visualizations are simply retrieved and displayed for the user. In the second alternate embodiment of the present invention, those steps which were not preprocessed would be performed "on the fly", and the results thereof similarly displayed.

To purchase the garment, the customer leaves the virtual fitting room and returns to the manufacturer web site.

BRIEF DESCRIPTION OF THE DRAWINGS

FIG. 8 is a flow diagram illustrating flow of data in an alternate embodiment of the present invention during operation of the virtual fitting room.

DETAILED DESCRIPTION

A system and method for implementing a "virtual fitting room" is disclosed. The virtual fitting room of the present invention, hereinafter referred to as the CLARITY FITTING ROOM[SM], is a software program that will, among other features, provide an actual analysis of how a garment will fit a customer, and which will provide a realistic visual representation of the garment's fit on the customer. Development of the CLARITY FITTING ROOM[SM] is premised upon the basic assumption that a garment's fit cannot be determined adequately by a user's simple body measurements alone. This assumption is verified by the fact that the largest problem plaguing mail-order and web-based fashion catalog companies is the return of merchandise due to poor fit. These fashion catalog companies provide tables of measurements that a consumer may compare to her own measurements to determine fit; but unfortunately, these simple measurements do not tell the whole story.

The CLARITY FITTING ROOM[SM] uses a full-body scanner (using any scanning technique, such as white light, laser, or infrared) to generate a cloud of over one hundred thousand data points to collectively describe the surface geometry of a body. The cloud of data is defined as a plurality of points defined as XYZ coordinates. By working with a cloud of data points, the system can remain scanner-independent; that is, it can use data generated by any scanner capable of generating a cloud of data points). The system then processes this data to achieve an accurate body scan fit model of the user. By gathering a broad database of such body scan fit models, the CLARITY FITTING ROOM[SM], will accurately predict the best-fitting size of a particular garment for an individual user, will analyze the resulting fit of that size garment on the individual user, and will display an accurate visualization of the garment's fit on the individual user.

In a preferred embodiment of the present invention, all information for the CLARITY FITTING ROOM[SM] is preprocessed to enable quick operation for the individual user. It is assumed that each of these preprocessing steps can be implemented similarly "on the fly" when average computer/modem processing speeds/data transfer rates/ bandwidth are increased. Until that time, it is necessary to develop several databases.

The following is a description of the CLARITY FITTING ROOM[SM], as well as a description of each of the necessary preprocessing steps.

I. PREPROCESSING

Figure 1:
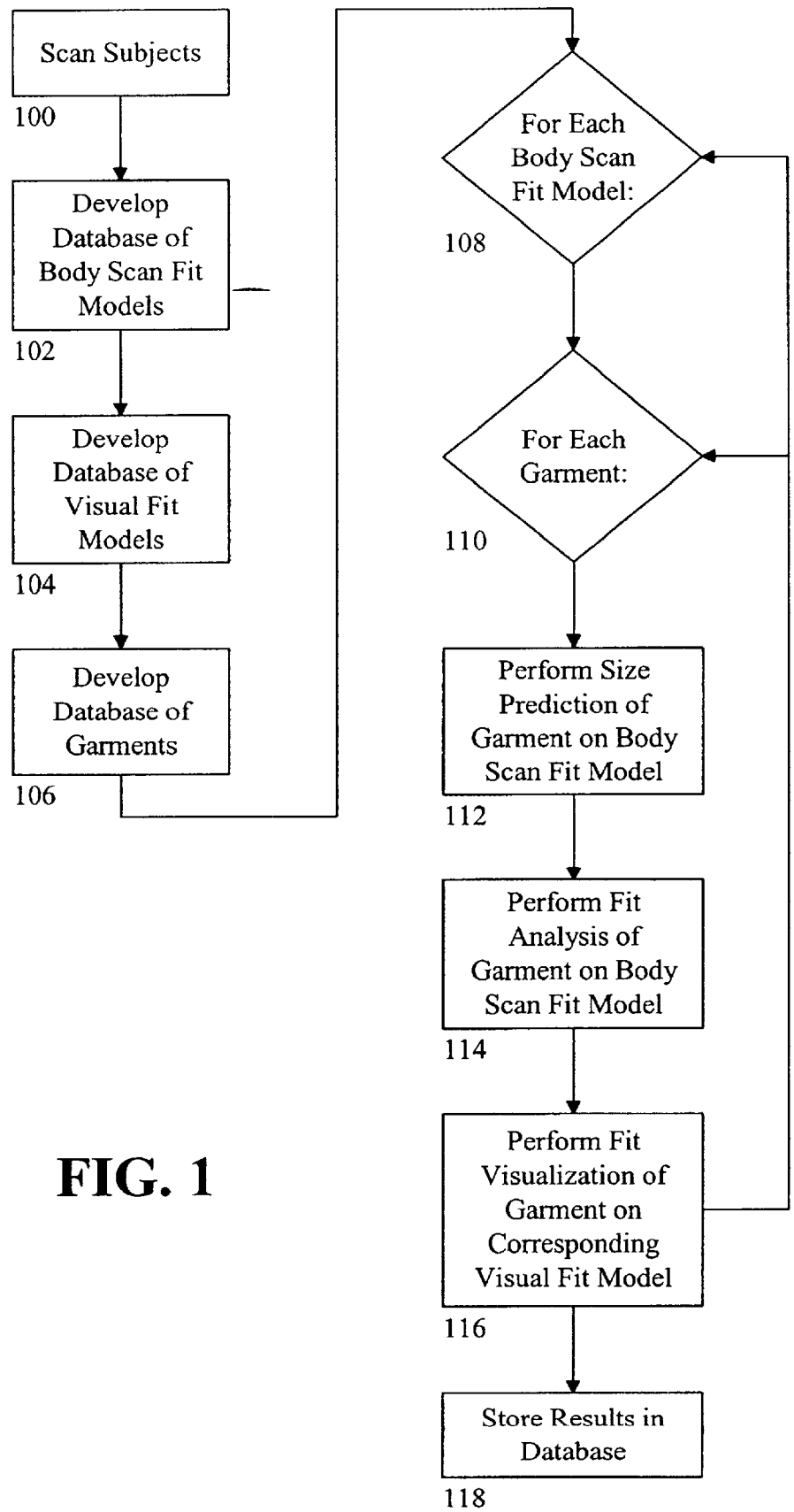
FIG. 1 is a flowchart illustrating a preprocessing method of initializing a virtual fitting room software program.

FIG. 1 is a flowchart illustrating a preprocessing method of initializing the CLARITY FITTING ROOM[SM]. These preprocessing steps require the full-body scanning of a plurality of subjects (step 100) and the development of several databases including a database of body scan fit models (step 102), a database of visual fit models (step 104), a database of available garments (step 106), and a database of size predictions (step 112), fit analysis (step 114) and fit visualizations (step 116). Each of these steps is discussed more fully below.

A. Scan Subjects

To enable an accurate prediction of the best-fitting size of a particular garment on an individual user, analysis of the resulting fit of that size garment on the user, and display of an accurate visualization of the garment's fit on the individual user, it is necessary to evaluate an entire body structure, rather than just a few two-dimensional measurements. The CLARITY FITTING ROOM[SM] therefore utilizes a full-body, three-dimensional scan of a multitude of subjects. This full-body scanner generates a cloud of over one hundred thousand data points defined as XYZ coordinates which collectively describe the surface geometry of a body. By working with a cloud of data points, the system can remain scanner-independent; that is, it can use data generated by any scanner, such as white light, laser or infrared scanner, capable of generating a cloud of data points. Once a large number of subjects have been scanned, any user, whether scanned or not, can accurately try clothes on in the CLARITY FITTING ROOM[SM] by accessing either her own scan model, or that of a substantially similar subject.

B. Develop Database of Body Scan Fit Models

Once a subject has been scanned, the CLARITY FITTING ROOM[SM] converts the scan data to a novel body structure (or body scan fit model), which is a mathematical model of the subject's body surface. This conversion process begins with a generic body structure, which is essentially a basic wire frame model having a fixed number of body structure elements (or body landmarks), such as, waist and hip locations. For each scanned subject, the location of these body structure elements is determined by analyzing the scan data to identify its proper placement on the scanned subject.

During this process, the scan data is segmented to place each of the major body parts (e.g., arms, legs, upper and lower trunk and head) on separate file layers so that body parts can be viewed and analyzed separately. These file layers may be visualized as overhead transparencies that may be viewed separately or in combination with each other.

Figure 2A:
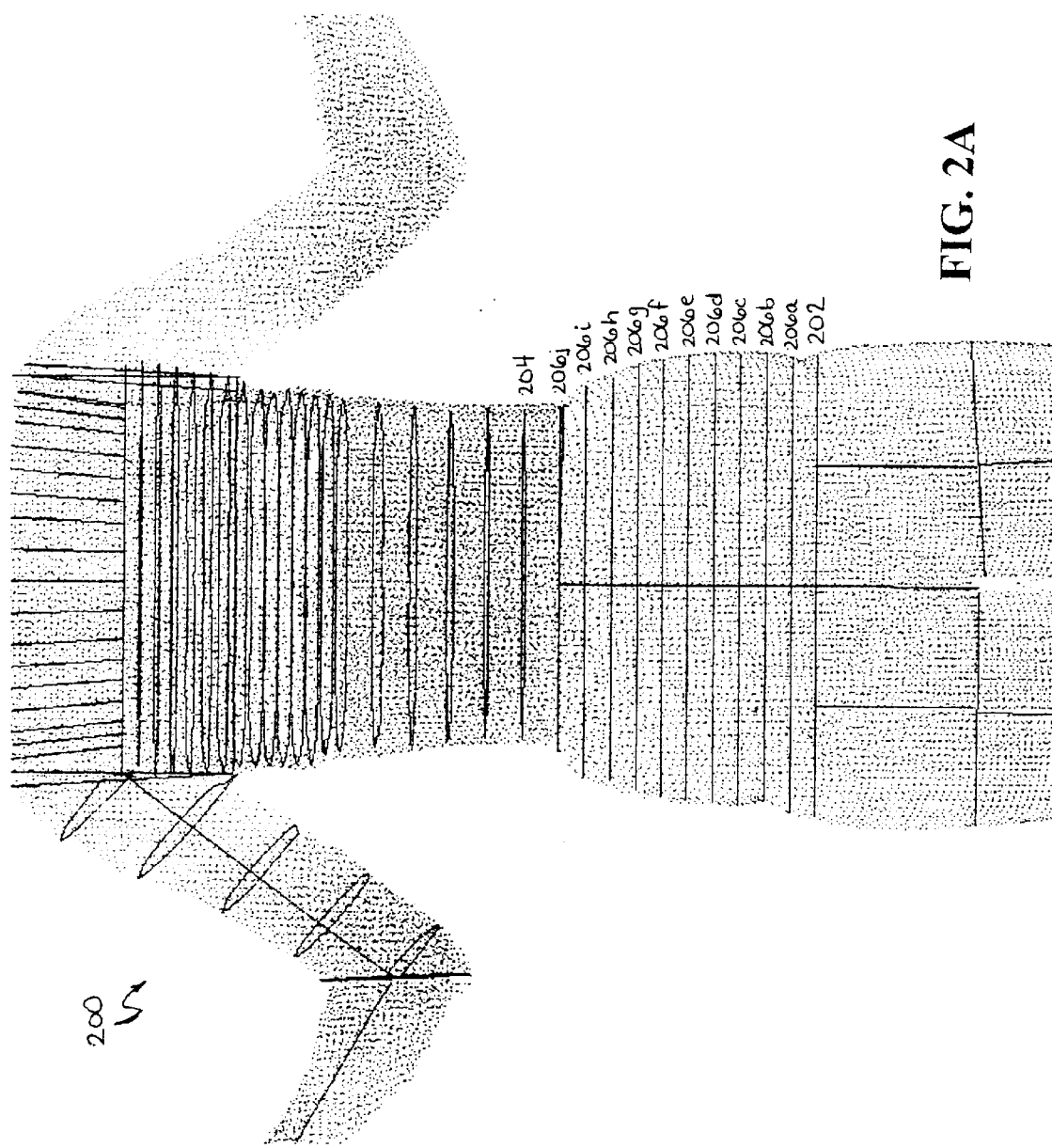
FIGS. 2A, 3A and 4A are front views of three differently-sized scan subjects illustrating raw scan data, as well as a body scan fit model for each subject.
Figure 2B:
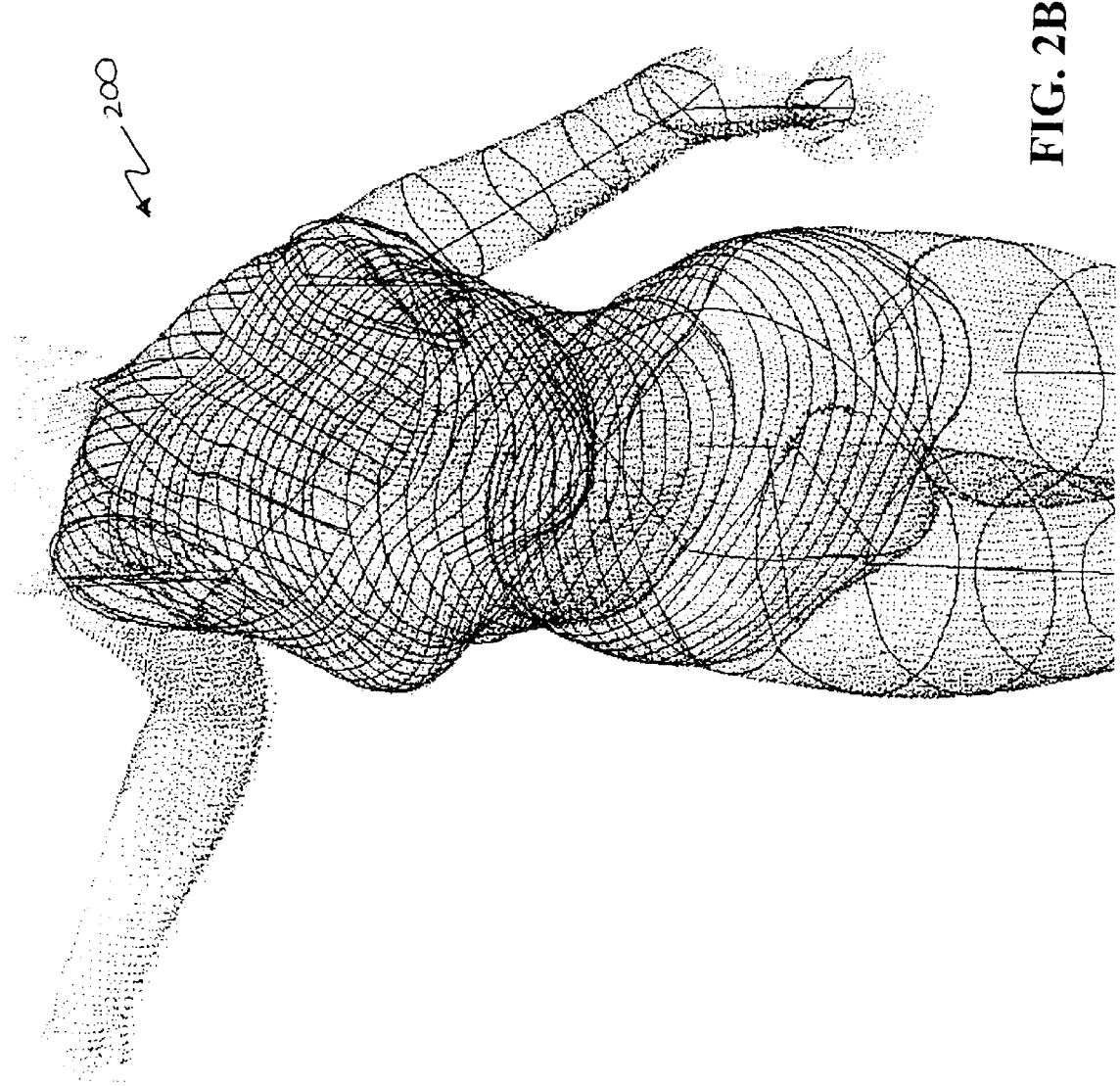
FIGS. 2B, 3B and 4B are views of the subjects of FIGS. 2A, 3A and 4A, wherein the subjects have been rotated approximately 45 degrees.
Figure 3A:
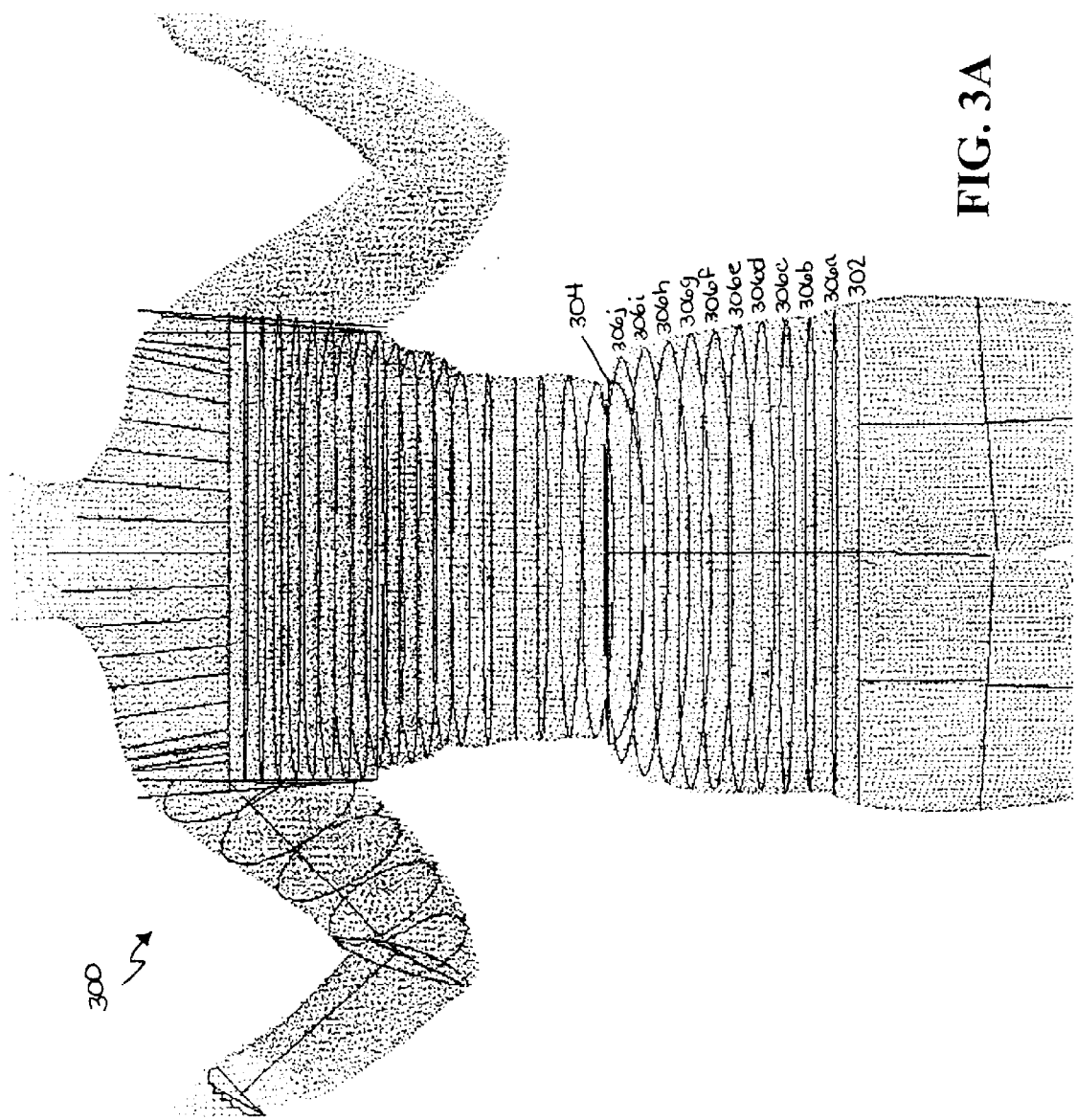
Figure 3B:
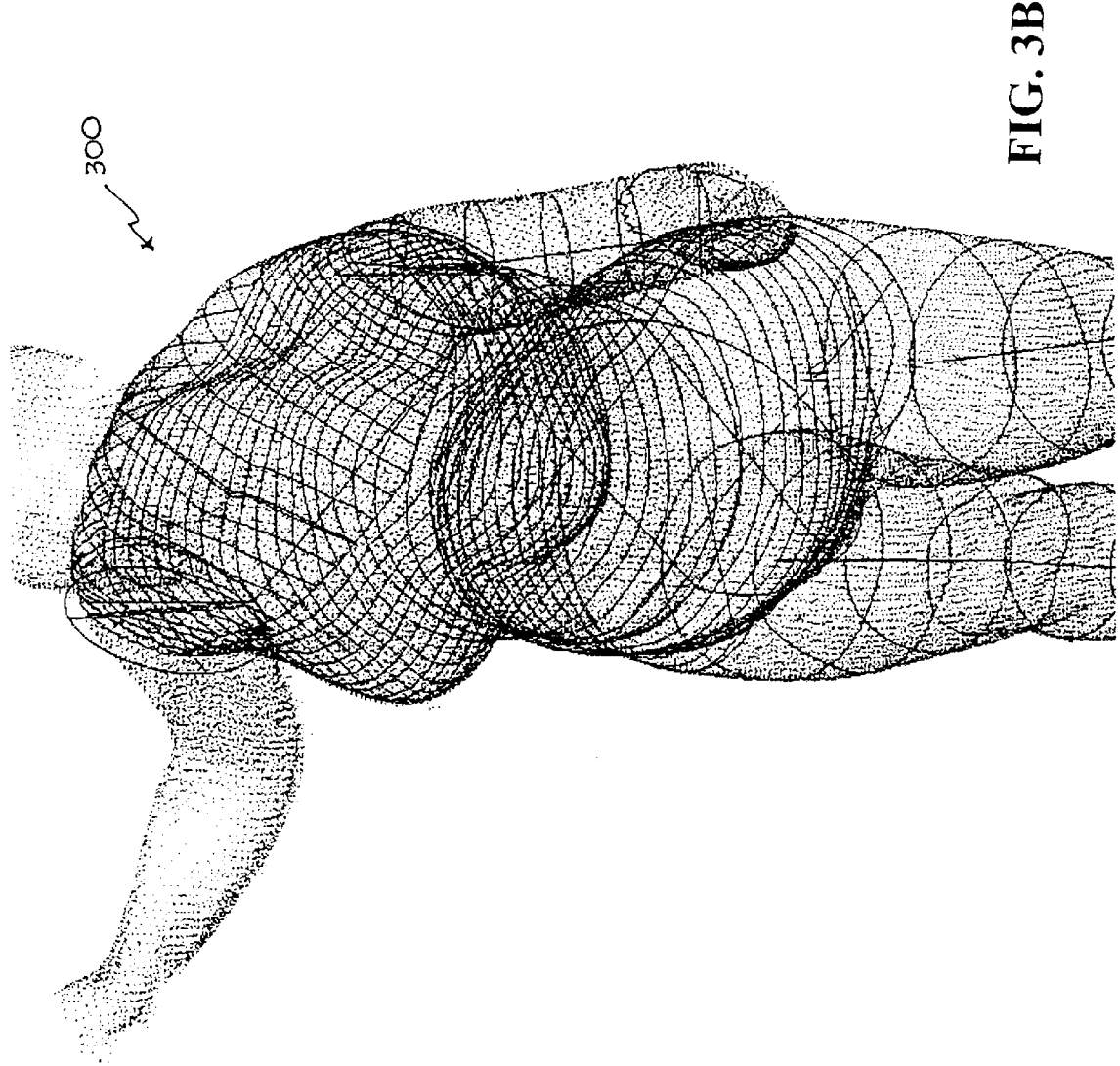
Figure 4A:
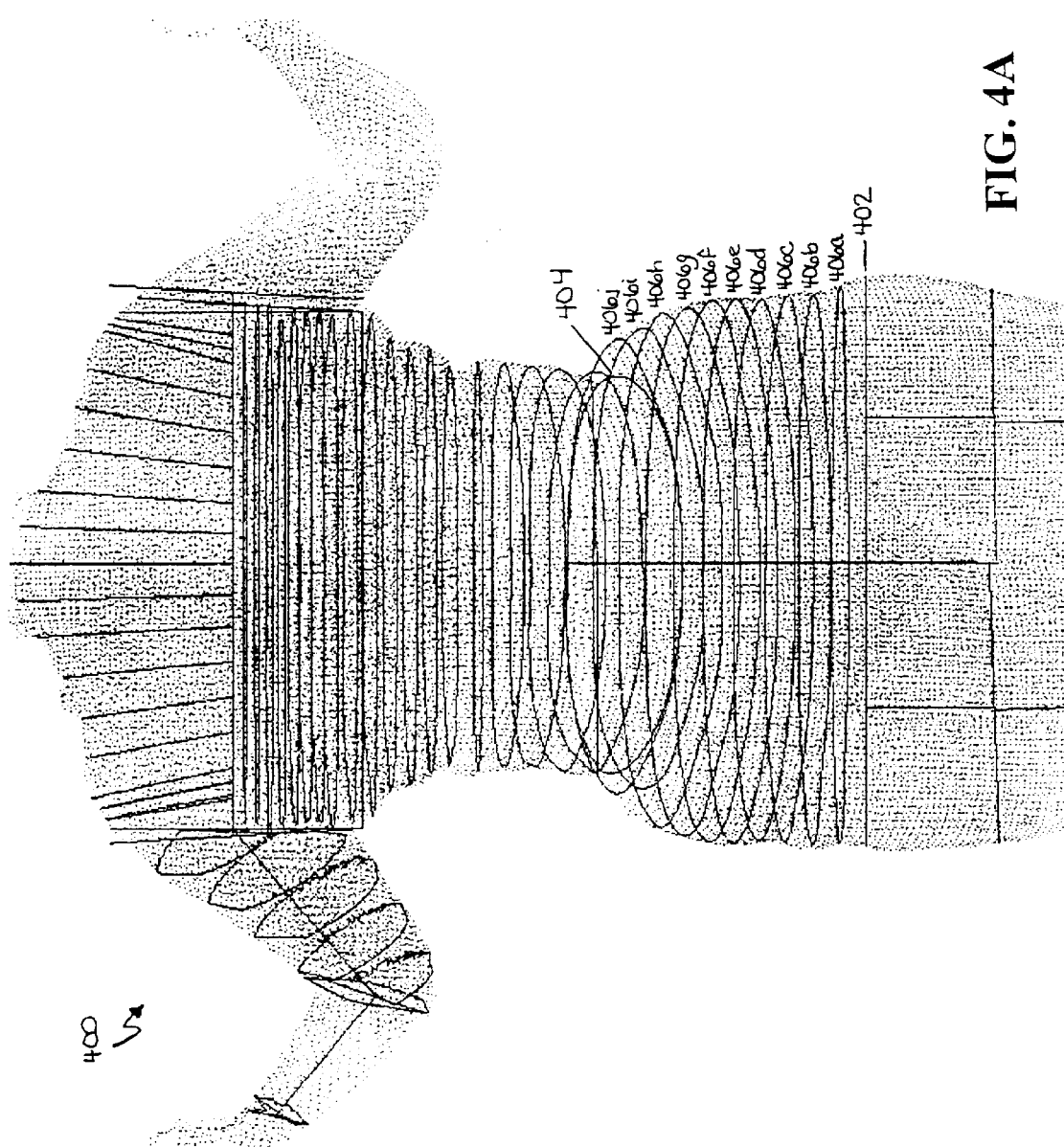
Figure 4B:
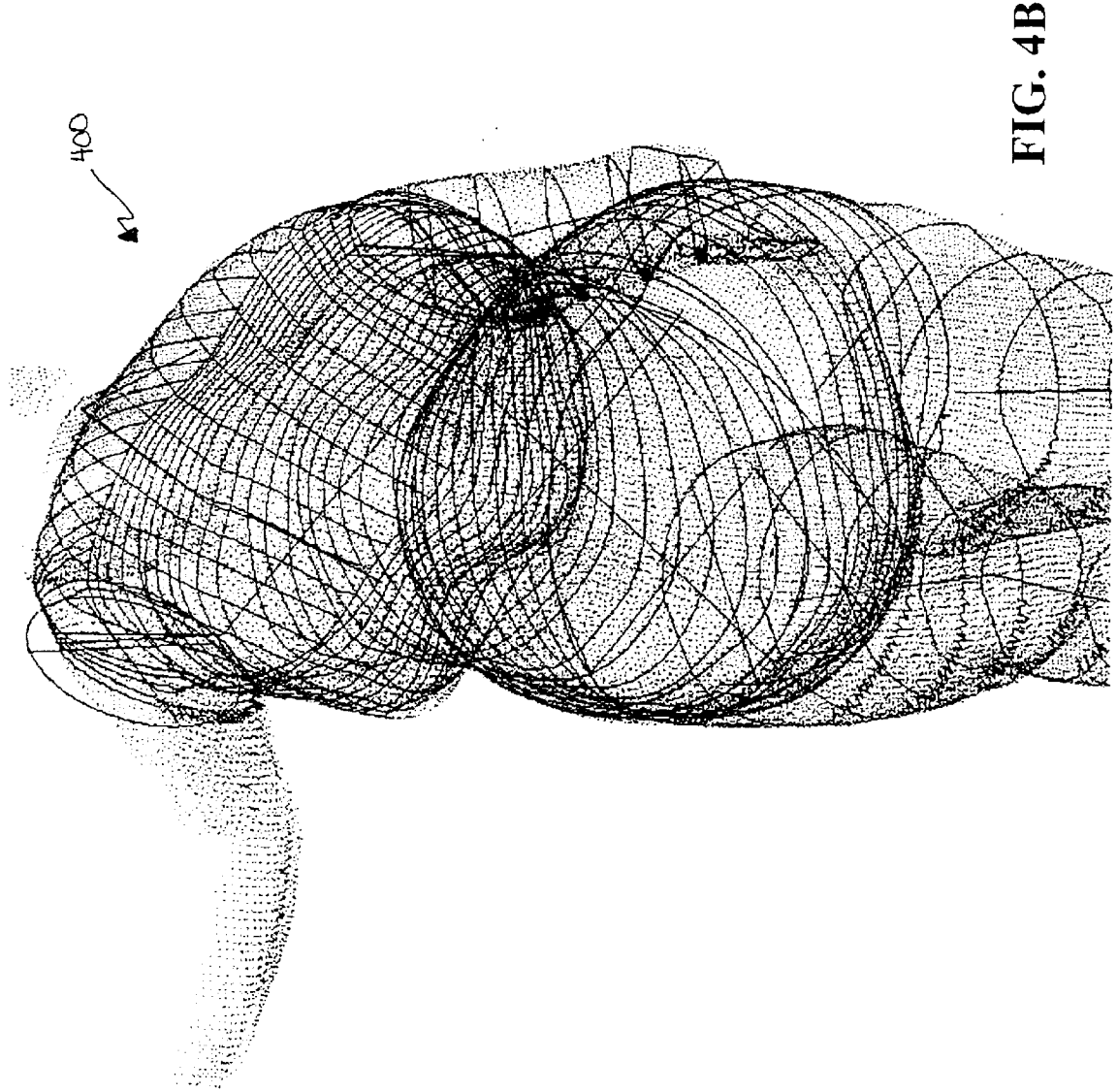

FIGS. 2A, 3A and 4A are front views of three differently-sized scan subjects illustrating raw scan data, as well as body scan fit models for each subject. FIGS. 2B, 3B and 4B are views of the subjects of FIGS. 2A, 3A and 4A, wherein the subjects have been rotated approximately 45 degrees.

These figures illustrate the way in which the same generic body structure is applied to three very different body forms. In each case, the individual elements of the generic body structure appear in the same relative location on each of subjects 200 (FIG. 2), 300 (FIG. 3) and 400 (FIG. 4). For instance, hip curve 202 is located in the same relative position of subject 200 as hip curves 302 and 402 are of respective subjects 300 and 400. Similarly, waist curves 204, 304 and 404 of respective subjects 200, 300 and 400 are in the same relative locations as each other. Also, in each of subjects 200, 300 and 400, an identical number of pelvic regions curves 206a–206j, 306a–306j, and 406a–406j are used to define the pelvic region of the subjects.

Once the body scan fit models are determined for each scanned subject, subsequent processes can more efficiently evaluate each scanned subject to determine the proper size garment and to analyze the fit of that garment because each body scan fit model identifies all key body locations of the scanned subjects.

Figure 5:
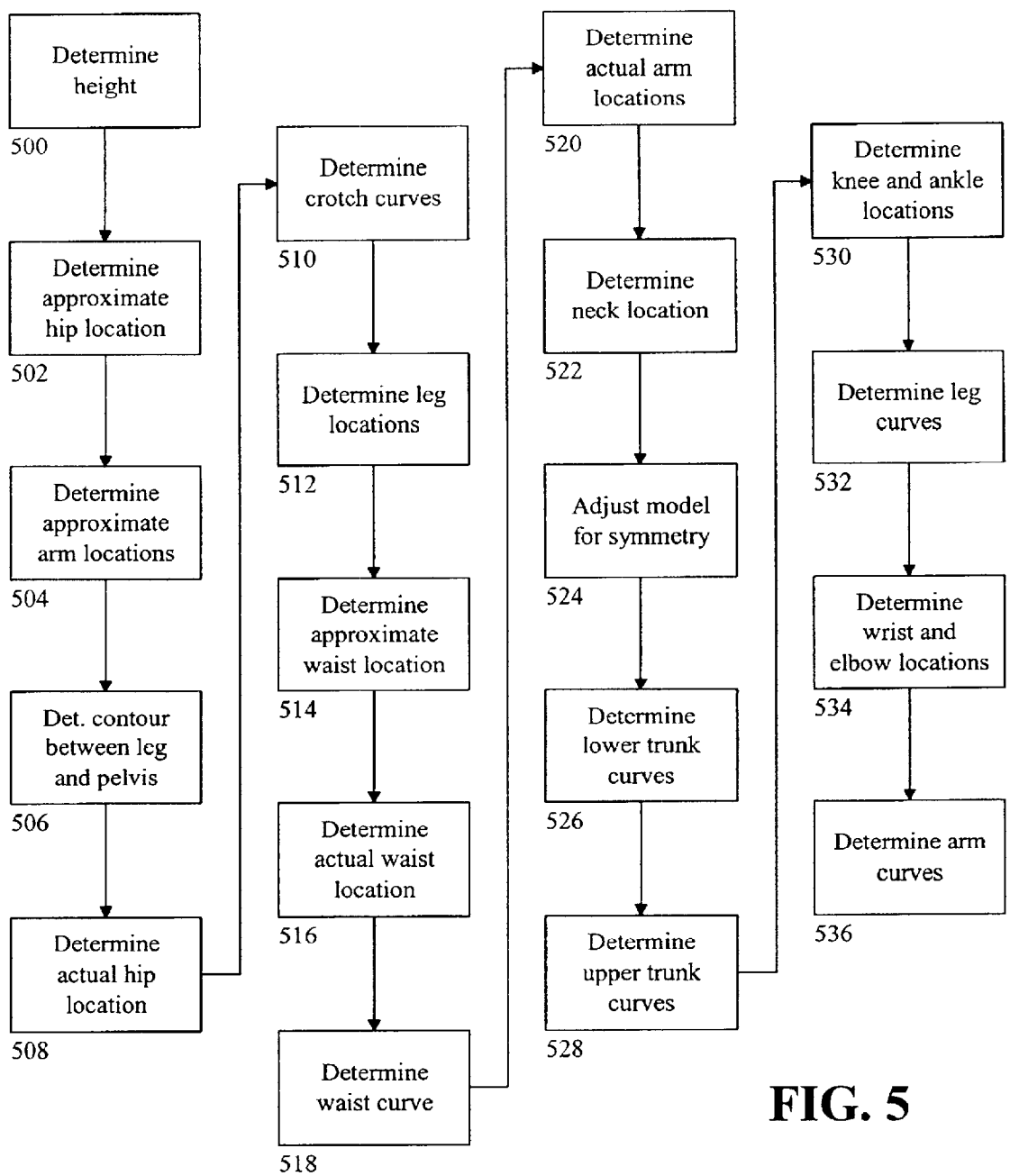
FIG. 5 is a flowchart illustrating a method of determining a body scan fit model from a collection of raw data points defining a surface geometry of a body.

FIG. 5 is a flowchart illustrating a method of determining a body scan fit model from a collection of raw data points defining a surface geometry of a body.

First, at step 500, the total height of the scanned body is determined from the raw data. At step 502, the total height is divided in half to determine an approximate location of the hip level.

At step 504, the arms are approximately located as those data points above the waist which extend outward from the body further than a widest point of the hip region.

At step 506, the data points in the hip region are analyzed to determine the contour defining the break between the legs and the pelvis.

At step 508, the actual hip location is narrowed in on by comparing cross-sectional slices of the raw data in the region of the approximated hip location. Side seam and center front locations of the body are determined in this step as well. The origin of the raw data is then moved to the center of the hip circumference since this is the body's approximate center of gravity.

At step 510, central data points in the lower hip and upper thigh regions are analyzed to determine the location of a front contour occurring between the legs and the pelvis and a back contour occurring between the legs and the buttocks. These two contours are used to determine the curves which define the crotch.

At step 512, the location of each of the legs is determined such that the legs can be removed from the body and placed on separate layers.

At step 514, an approximate location of the waist is determined by evaluating relative proportions of the body. At step 516, the actual waist is narrowed in on. The system fits a front contour along the front waist region of the body, a back contour along the back waist region of the body, and side contours along the side waist regions of the body. The waist is generally slanted (e.g., not normal to the height of the body), with the slant being greater in larger bodies than in smaller bodies. The waist connects between the indentations of the front, back and side contours. At step 518, curves that define the waist are determined.

At step 520, the actual location of the arms is determined by evaluating contours formed between the arms and the torso.

At step 522, the location of the neck is determined.

At step 524, the raw data and model are adjusted to compensate for lack of symmetry in the upper body. Virtually everyone is asymmetrical to some extent; however, virtually everyone wears symmetrical clothing. Moreover, no matter how sincerely a scan subject tries to stand symmetrically, the body can easily shift into an asymmetrical position. It would be a mistake to conclude from this that the individual needs asymmetrically adjusted garments. The object of the present invention is to visualize fit in symmetrical garments, rather than to fine-tune fit to include adjustments for asymmetry. The midpoint of the neck region is used to determine the necessary adjustment so that the upper body is symmetrical over the lower body.

At step 526, curves are determined to define the lower trunk, or torso, section of the body. The lower trunk region is defined as the region between the crotch and the waist, excluding the legs. Similarly, at step 528, curves are determined to define the upper trunk, or torso, section of the body. The upper trunk region is defined as the region between the waist and the shoulders, excluding the arms. Each of the curves in the lower and upper trunk regions are taken horizontally through the body, and define cross-sections of the trunk region.

At step 530, curves are determined to define the shoulder region of the body. The shoulder curves are taken vertically over the shoulder to better preserve the shoulder details.

At step 532, the locations of the knees and the ankles are determined. Then, at step 534, curves are determined to define the upper legs (above the knee) and lower legs (below the knee). The curves are taken around the legs to define cross-sections of the legs.

At step 536, the locations of the elbow and wrist are determined. Then, at step 538, curves are determined to define the upper arms (above the elbow) and lower arms (below the elbow). The curves are taken around the arms to define cross-sections of the arms.

After the body structure is created, corresponding points can be found on every scan regardless of body size or shape. Thus universal garment programs can be generated which are drawn to the same location, such as center front waist or side neck, either for modeling custom-fitted garments or for determining the best fitting size of standard-sized garments.

It is conceived that the steps in the above process for generating a body scan fit model may be performed in an order different than the above-listed order.

Although this process is preferably preprocessed, the conversion from scan data to a body scan fit model may be performed "on the fly" when average computer/modem processing speeds/data transfer rates/ bandwidth are increased.

C. Develop Database of Visual Fit Models

Once the scan data and body scan fit models have been developed, a plurality of visual fit models are created to enable a visualization of a garment's fit on a particular user. In a preferred embodiment of the present invention, each visual fit model is linked to at least one body scan fit model. To minimize storage space, body scan fit models having similar measurements may share a common visual fit model. Preferably, each visual fit model is also created with several different skin tones and hairstyles.

A specific visual fit model is built from a generic, three-dimensional model. The generic model is preferably a parametric one that can be personalized via a multitude of parameters. These parameters include specific dimensions and properties desired of the specific visual fit model. The physical dimensions are extracted from a specific body scan data and/or body scan fit model. The properties include such information as skin tone and hairstyle, and are personally selected by the user. For the unscanned user who has selected another's body scan fit model to use in the CLARITY FITTING ROOM℠, the physical dimensions are extracted from that specific body scan data and/or body scan fit model, rather than the dimensions entered by the user when selecting a body scan fit model. In a preferred embodiment, the number of parameters used to define the body scan fit model is preferably greater than about 20 different dimensions. Importantly, these parameters include more than the generic bust, waist and hip measurements used in the prior art.

Although this process is preferably preprocessed, the conversion from body scan fit model to visual fit model may be performed "on the fly" when average computer/modem processing speeds/data transfer rates/ bandwidth are increased.

D. Develop Database of Garments

A database of garment models is also created during these preprocessing steps. A clothing visualization designer will review information such as a manufacturer's garment specifications, grading rules, sizing information, actual fit model, and fit of the actual garments on the fit model to develop garment models for each of the garments available for "virtual try-on". This process is presently performed manually, but it is envisioned that this step may eventually be implemented automatically.

E. Develop Database of Size Predictions, Fit Analysis and Fit Visualizations Once the databases of visual fit models and garments are created, a database of size predictions, fit analysis, and fit visualizations is created. Each body scan fit model is analyzed in comparison to each garment to predict the proper size(s). If multiple sizes each offer some degree of "fit", the system will allow the user to see herself in both sizes. If a size is available in that garment for that user, a fit analysis is performed of the body scan fit model in the selected size of the garment (as well as one size up and one size down). Finally, fit visualization images are created to allow subsequent visualization. The results of these three processes are then preferably stored in a database for quick access when a user chooses to virtually "try-on" a particular garment. As mentioned above, the processes may be performed on the fly 1. Size Prediction/Fit Analysis Size prediction is implemented by first determining a number of fit factors for a given garment model. Fit factors for a jacket may include such measurements as overarm circumference, biceps circumference, sleeve length and major circumference. Then, for each fit factor, a method of measuring the key dimensions on both the garment model and the body scan fit model are determined. Also for each fit factor, threshold values of the key dimension are determined to place the user into an appropriate size category.

The CLARITY FITTING ROOM℠ determines the appropriate size garment by evaluating each fit factor, starting at the top of the garment, on the specific body scan fit model. An analysis is run for each fit factor to determine which size is necessary for each fit factor. The overall size will be based upon the closest fit of all fit factors, which is often the largest size required by any of the given fit factors. The fit of the final size at each fit factor is then processed to provide a fit analysis of that garment on the user with regard to each of the fit factors. Alternatively, a fit analysis may also be performed on one size up and one size down from the selected size to allow the user to determine which fit issues are the least objectionable.

As an example of this size prediction process, one method of predicting the proper size of a jacket could be performed as follows:

a. Use an "overarm circumference" dimension of the body scan fit model to make a first guess at the proper size of the jacket;

b. Compare a "biceps circumference" dimension of the current size jacket and of the body scan fit model, and increase the current size of the jacket if necessary;

c. Test for variance between a "sleeve length" dimension of the current size jacket and of the body scan fit model;

d. Compare a "back across mid-armscye" dimension of the current size jacket and of the body scan fit model, and increase the current size of the jacket if necessary;

e. Compare a "major circumference" (e.g., chest or bust) dimension of the current size jacket and of the body scan fit model, and increase the current size of the jacket if necessary;

f. Compare a "major front chest or bust" dimension of the current size jacket and of the body scan fit model, and increase the current size of the jacket if necessary;

g. Compare a "major central girth" (e.g., midriff or high hip) dimension of the current size jacket and of the body scan fit model, and increase the current size of the jacket if necessary;

h. Test for variance between a "major central girth" dimension (separately testing front and back dimensions) of the current size jacket and of the body scan fit model to assess drape of the jacket on the body scan fit model;

i. Test for variance between a "length to central girth (absolute)" dimension of the current size jacket and of the body scan fit model;

j. Test for variance between a "length to central girth (surface front and back)" dimension of the current size jacket and of the body scan fit model to assess balance issues;

k. Compare a "major hip girth" dimension of the current size jacket and of the body scan fit model, and increase the current size if necessary; and l. Test for variance between a "major hip girth" dimension (separately testing front and back dimensions) of the current size jacket and of the body scan fit model to assess drape of the jacket on the body scan fit model.

Upon completion of this process, the size to be recommended is the current size at the end of this analysis.

Although the user may fit into the selected size garment, the garment may still not fit well. Therefore, the fit of the selected size garment on the body scan fit model is analyzed. This analysis is performed by stepping through each of the fit factors evaluated during the size prediction process, and noting any final fit issues. For instance, the fit analysis may return that each of the fit factors is perfect, except that the "sleeve length" is long. Alternatively, a fit analysis may also be performed on one size up and one size down form the selected size to allow the user to determine which fit issues are the least objectionable. For example, a size 10 may fit pretty well throughout, but be a little tight across the bust. However, the size 12 may fit fine across the bust but be fairly loose everywhere else. The user can then decide which size, and therefore which type of fit, she would prefer according to her own preferences.

The results of this size prediction and fit analysis is then stored in a database to shorten the amount of time necessary to run the CLARITY FITTING ROOM$^{SM}$. Although this process is preferably preprocessed, this size prediction and fit analysis of a garment on a body scan fit model may be performed "on the fly" when average computer/modem processing speeds/data transfer rates/ bandwidth are increased.

By evaluating each of the body and the garment in three-dimensions, a much more accurate assessment of fit is possible than with simple two-dimensional measurements, as done in the prior art.

2. Fit Visualizations

Finally, fit visualization images are created to allow for subsequent visualization of fit. The fit visualization process utilizes the results of the fit analysis process to illustrate how a particular size garment will look on a specific user. For each fit factor of the garment, the fit analysis generates a numerical value along a continuum from very loose to very tight. These numerical values are then used to generate images of the garment fitting the visual body model in a specific way for each fit factor. The outcome of the fit visualization process is images of the analyzed garment on the visual fit model of the individual for whom the size prediction/fit analysis was performed. Because this information is preprocessed, several two-dimensional images (for instance, a front, back and three-quarter view) of the visual fit model wearing the selected garment are saved as fit visualizations, rather than saving a three-dimensional image of the visual fit model wearing the garment. The two-dimensional images require less storage space than the three-dimensional model.

Although this process is preferably preprocessed, the generation of fit visualizations may be performed "on the fly" when average computer/modem processing speeds/data transfer rates/bandwidth are increased.

F. Data Flow

Figure 6:
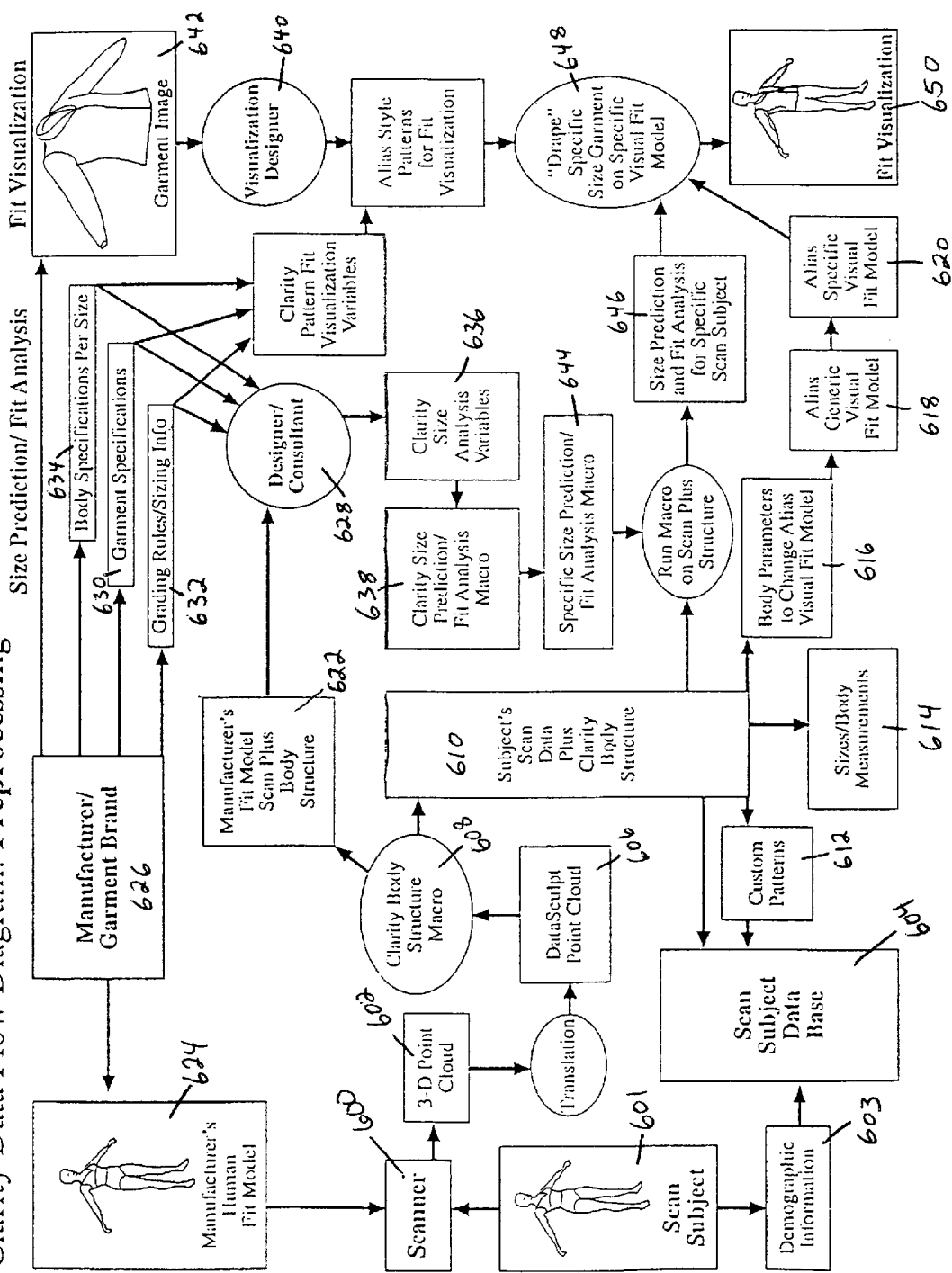
FIG. 6 is a flow diagram illustrating flow of data in an alternate embodiment of the present invention during preprocessing prior to operation of the virtual fitting room.

FIG. 6 is a flow diagram illustrating flow of data in an alternate embodiment of the present invention during pre-processing prior to operation of the CLARITY FITTING ROOM$^{SM}$. As shown in FIG. 6, a scanner 600 is used to generate a three-dimensional cloud of data 602 of a scan subject 601. At the time of scanning, the scan subject fills out a demographic survey to compile demographic information 603 which allows for implementation of subsequent data mining processes. This demographic information is stored in a "Scan Subject Data Base" 604.

The cloud of data produced by the scanner, e.g., the "DataSculpt Point Cloud" 606, is then transformed into the body scan fit model 610 through use of a macro entitled the "Clarity Body Structure Macro" 608. The macro 608 can alternatively be a hard-coded program. This body scan fit model 610, along with the original scan data 602, is then stored along with the demographic information 603 in the Scan Subject Data Base 604. The body scan fit model 610 may also be used when generating custom-fit patterns 612, which would also be stored in the Scan Subject Data Base 604. The basic measurements of the body scan fit model 614 are determined to allow for easier selection of approximate fit models for unscanned users of the CLARITY FITTING ROOM$^{SM}$. A multitude of body parameters 616 are determined from the body scan fit model 610 to modify an Alias$^{SM}$ Generic Visual Fit Model 618 to accurately represent the user with an Alias$^{SM}$ Specific Visual Fit Model 620. Although an Alias$^{SM}$ model is used in this embodiment, the present invention contemplates that other visualization software programs can be used to create the visual fit model.

The scanner 600 is also used to generate a three-dimensional cloud of data 622 of a manufacturer's human fit model 624 for a particular garment or brand of clothing 626. As with the user scan subject 601, the scan data 602 is transformed into a body scan fit model 622 through use of the Clarity Body Structure Macro 608. The manufacturer's body scan fit model 622 and scan data 602 are then given to a "Designer/Consultant" 628. The Designer 628 analyzes several of the manufacturer's actual garments 626, the manufacturer's stated body specifications per size, the manufacturer's stated garment specifications 630, the manufacturer's grading rules and sizing information 632, and the manufacturer's body scan fit model 634 to determine the appropriate size, or fit, variables 636 and "Size Prediction/Fit Analysis Macro" 638.

All of the information received by the Designer/Consultant 628 is also received by a "Visualization Designer" 640 to enable the Visualization Designer 640 to develop visual garment models 642.

The Clarity Size Prediction/Fit Analysis Macro 638 for a specific garment is then run on a specific scan subject 601 to perform size prediction and fit analysis 644. Finally, using the results of the size prediction/fit analysis macro 646, the visual garment model image is "draped" 648 on the visual fit model image 620 to produce a "Fit Visualization" 650.

II. THE CLARITY FITTING ROOM$^{SM}$

Figure 7:
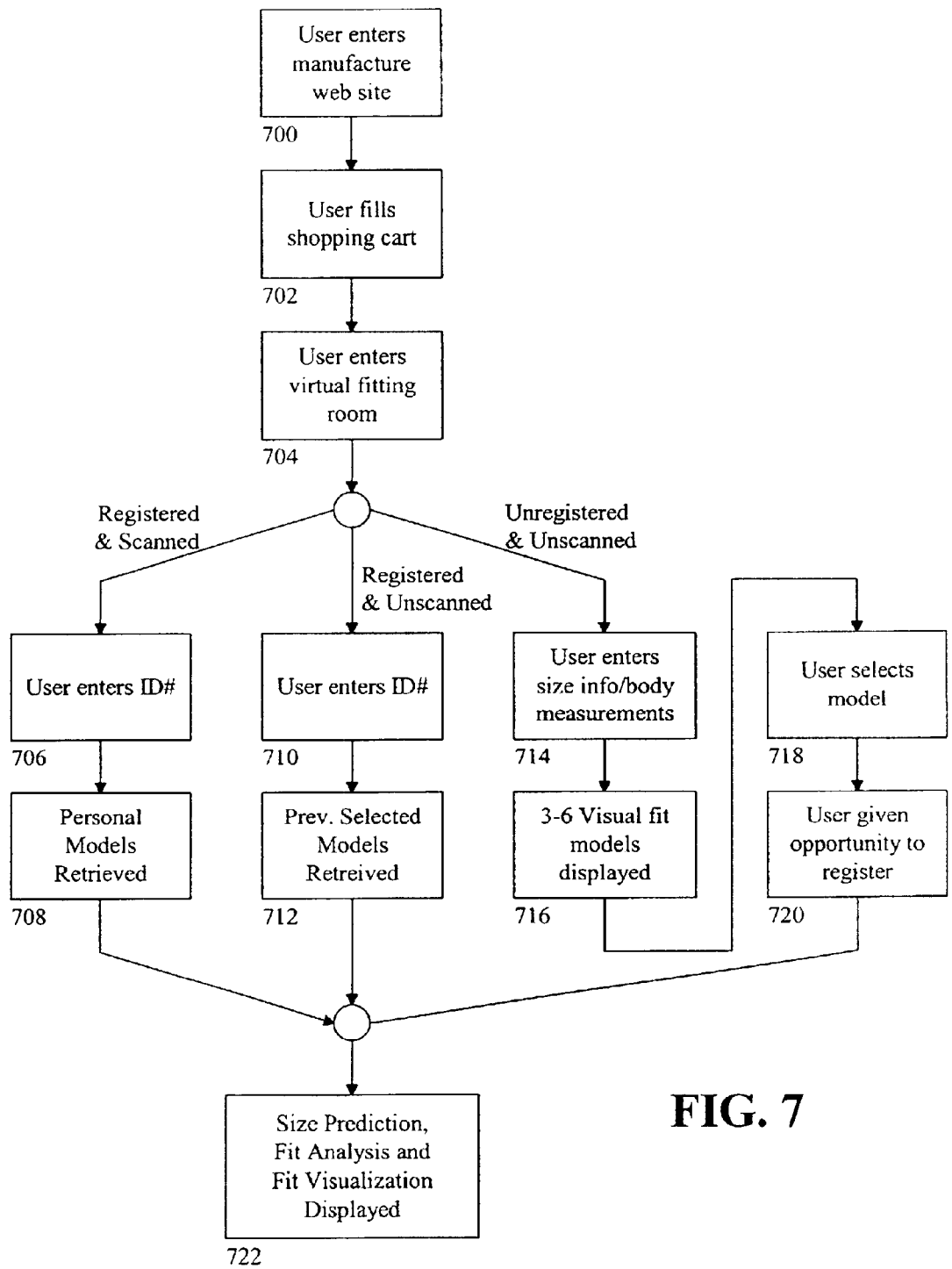
FIG. 7 is a flowchart illustrating a preferred method of implementing a virtual fitting room system and method.

The CLARITY FITTING ROOM$^{SM}$ preferably operates in an Internet environment, although it is equally usable in desktop computer or PDA format. FIG. 7 is a flowchart illustrating a preferred method of implementing the CLARITY FITTING ROOM$^{SM}$ system and method. A user, prior to entering the CLARITY FITTING ROOM$^{SM}$, visits a participating manufacturer's web site to select the clothing she would like to virtually "try-on". (Step 700). The user's selected garments are placed in a virtual "shopping cart". (Step 702). Once the user has selected all of the garments she would like to try-on, she brings her shopping cart into the virtual fitting room by selecting a button on the manufacturer's web site. (Step 704). At this point, there are three options depending on the user's status as: (a) previously registered and personally scanned; (b) previously registered but not personally scanned; or (c) neither previously registered nor personally scanned.

If the user has been previously registered and personally scanned, the user enters her personal identification number to have her personal body scan and visual fit models retrieved. (Steps 706 and 708). If the user has not been previously scanned, but has been previously registered, the user enters her personal identification number to have her previously-selected body scan and visual fit models retrieved. (Steps 710 and 712).

Finally, if the user has neither been previously scanned nor registered, the user enters her sizing information and/or body measurements. (Step 714). Sizing information may include such information as what size she wears in a particular manufacturer's clothing. The sizing information and/or body measurements will be analyzed to select a visual fit model to the user. (Step 716). If she registers with the virtual fitting room, she can later retrieve the same visual fit model for future visits to the fitting room. (Step 720).

To enable a proper match to a body scan fit model, an unscanned user can choose to enter her own measurements (such as bust, waist, hip, height and bra size) or have her measurements calculated. In having her measurements calculated, a series of questions regarding fit are posed to the unscanned user. These questions may ask the user for such information as her height, bra/cup size, typical jacket size, typical blouse size and/or typical pants size.

From these initial questions, a best guess at the user's measurements can be obtained and presented to the user. If the user commonly has fit issues with off-the-rack clothing, the user is presented with a series of questions regarding fit of off-the-rack clothing. This series of questions is designed to most closely match the unscanned user to a body scan fit model. Questions regarding the fit of off-the-rack clothing may include any of the following:

With respect to upper body fit issues in off-the-rack clothing, relevant questions may include:

Do the shoulders tend to be (a) tight, (b) about right or (c) loose?

Does the bust tend to be (a) tight, (b) about right or (c) loose?

Does the midriff tend to be (a) tight, (b) about right or (c) loose?

Does the waist tend to be (a) tight, (b) about right or (c) loose?"

With respect to sleeve and torso fit issues in off-the-rack clothing, relevant questions may include:

When purchasing upper body garments in size (i) misses, (ii) plus, (iii)junior, (iv) tall, (v) plus tall, (vi) petite, (vii) plus petite, does the sleeve length tends to be (a) too long, (b) too short or (c) about right? How many inches too long or too short? Does the upper torso length (neck to waist) tend to be (a) too long, (b) too short or (c) about right?

With respect to lower body fit issues in off-the-rack clothing, relevant questions Does the waist tend to be (a) tight, (b) about right or (c) loose?

Does the high hip tend to be (a) tight, (b) about right or (c) loose?

Does the hip width tend to be (a) tight, (b) about right or (c) loose?

Does the seat tend to be (a) tight, (b) about right or (c) loose?

Does the thigh tend to be (a) tight, (b) about right or (c) loose?

With respect to rise and inseam fit issues in off-the-rack clothing, relevant questions may include:

When purchasing lower body garments in size (i) misses, (ii) plus, (iii)junior, (iv) tall, (v) plus tall, (vi) petite, (vii) plus petite, does the rise (length from crotch to waist) tend to be (a) too short, (b) about right or (c) too long?

Does the inseam tend to be (a) too long, (b) about right or (c) too short? How many inches too long or too short?

The user can also select posture, which can affect how a garment fits.

Once the user has responded to any relevant fit questions, the initial estimates of the user's measurements can be adjusted to account for the inputted information. This system allows for the an accurate match of the unscanned user (assuming the user input accurate information) with a body scan fit model. From this data, an appropriate visual fit model can be selected.

Once presented with a visual fit model, the customer selects which of the garments brought with her to the CLARITY FITTING ROOM$^{SM}$ she would like to "virtually try-on". If all data has been preprocessed, the preprocessed size prediction, fit analysis and fit visualizations are simply retrieved and displayed for the user; otherwise, those steps which were not preprocessed are performed "on the fly", and the results thereof similarly displayed. (Step 722). To purchase the garment, the customer leaves the virtual fitting room and returns to the manufacturer web site.

The CLARITY FITTING ROOM$^{SM}$ may provide a virtual sales person to suggest additional garment choices, as well as help to choose the brands and styles that best fit the customer. The CLARITY FITTING ROOM$^{SM}$ may also include animated sequences of the visual fit model wearing and moving in the garment (walking, dancing, playing sports, etc.).

The CLARITY FITTING ROOM$^{SM}$ may also be used for just its size prediction and fit analysis features. For instance, a manufacture web site could provide a pop-up window that simply instructs the user as to the predicted size and fit analysis based on identification of an accurately matched body scan fit model.

FIG. 8 is a flow diagram illustrating a flow of data in an alternate embodiment of the present invention during operation of the CLARITY FITTING ROOM$^{SM}$. As shown in FIG. 8, an "Internet Customer" 800 first enters a "Client Company Web Site" 802. At the client company web site 802, the customer 800 select which garments she would like to virtually try-on by placing those garments in a virtual "Shopping Cart". The customer then enters the CLARITY FITTING ROOM$^{SM}$ 804. From there, if the customer 800 has previously registered, the customer 800 will log in by entering her "Clarity User Name" and "Password", and her information can be retrieved from the "Data Base of Registered Fitting Room Customers" 806.

If the customer 800 has not previously registered, she must first select a body scan fit model (step 808). This process begins by prompting the customer 800 to enter her measurements and other size indicators 810. That information is then compared to a "Data Base of Scan Subject ID Numbers Linked to Size, Body Measurements, & Visual Fit Models" 812. From that database, several body scan fit models are selected (step 814) as possible fit models for the customer 800. Visual fit models associated with those possible fit models are presented (step 816) to the customer 800 to allow the customer 800 to select the fit model which best approximates her body type and posture. Once a customer 800 has selected a body scan fit model for use (step 808), the customer 800 is given the option of registering (step 818) with CLARITY$^{SM}$ to allow for quicker service in subsequent visits to the CLARITY FITTING ROOM$^{SM}$. If the customer 800 chooses to register (step 818), she either selects or is assigned a Clarity User Name and a Password 820. All necessary information relating to the customer 800 is then saved in the Data Base of Registered Fitting Room Customers 806.

At this point, the CLARITY FITTING ROOM$^{SM}$ is ready to allow the customer to virtually try-on the garments she brought with her into the fitting room 804. The recommended size(s) and fit analysis of the garment are then displayed (step 826). The "Data Base of Visual Fit Models Linked to Fit Visualization Images" 824 and the "Data Base of Fit Visualization Images for All Analyzed Garments on All Visual Fit Models" 830 are then accessed to display the fit visualization of the user in the selected size garment (step 832). Additionally, the "Data Base of Client Company's Garment Images" 834 is accessed to display a photograph of the garment (step 836) so that the customer can better view garment details such as fabric and buttons.

The entire time that the customer is in the CLARITY FITTING ROOM$^{SM}$, the customer's session behavior is monitored and stored in a "Data Base of Fitting Room Session Behavior Linked to Body Form" 838 for use in subsequent data mining processes.

III. DATA MINING

The CLARITY FITTING ROOM$^{SM}$ system and method performs data mining functions to enable clothing manufacturers to better serve their customers. In performing these data mining functions, the CLARITY FITTING ROOM$^{SM}$ can access information derived from the body scan data and corresponding demographic information collected at the time of the scan, as well as CLARITY FITTING ROOM$^{SM}$ session history and size registry information. Information can also be gleamed from individuals who have not been scanned since an unscanned user's choice of an approximate fit model reveals sufficient body form information for many applications.

A. Size Development

A first use for data mining is size development. The prior art method used by every apparel manufacturer to develop a garment line and corresponding sizes relies almost solely on the selection of a single human fit model. In using this single human fit model, the manufacturer assumes that this individual best reflects the body proportions of persons in the manufacturer's target market. The fit established from that one individual becomes the standard for that garment line. Grade rules are arithmetically applied to that standard to develop additional sizes. In this method, there is no true reference to actual body proportions in a greater sample of body types. As a result, this method can not and does not accurately anticipate all the variations in real body geometry from person to person or from size to size. This statement's veracity is reflected in the variations of garment fit not only from manufacturer to manufacturer, but from size to size in a single line of clothing.

The CLARITY FITTING ROOM$^{SM}$ performs data mining functions for a manufacturer to enable the manufacturer to have a true idea of actual body proportions in a greater sample of body types. By evaluating demographic information collected with each scan, a representative sample of individuals can be selected according to a demographic profile of the manufacturer's target customer. By grouping together similarly dimensioned individuals, sizes can be created to best fit the target market. Sizes developed in this manner will fit a greater proportion of people from a target demographic group because the sizes were developed directly for those persons.

B. Size Scaling

A second use for data mining is size scaling, which is the determination of a proportion of garments in each size to be shipped to a given store. By mining data in the CLARITY FITTING ROOM$^{SM}$, these size scaling decisions can be improved by identifying the size range and distribution of sizes corresponding to those persons likely to purchase those specific garments from the specific store. For instance, a Minnesota store may need a greater proportion of larger sizes that a New York store. This size scaling function will help retailers to maintain a complete size selection for a given item until that item is close to being sold out, thereby eliminating the need to rapidly discount the items because certain sizes in the range have been sold out ahead of the rest.

C. Other Functions

Data mining in the CLARITY FITTING ROOM$^{SM}$ session history might also link body form information to sales, try-ons with no sales, and returns. This information might suggest the loss of significant sales due to a characteristic body shape not being accommodated by the manufacturer's offerings.

Data mining in the CLARITY FITTING ROOM$^{SM}$ session history might also associate which colors and styles were tried on relative to a particular size assortment. For example, assumptions are commonly made about the availability of certain colors and/or styles in certain sizes. This information would confirm or refute these assumptions for better prediction of sales in the full range of sizes.

IV. CUSTOM PATTERN GENERATION

Finally, the three dimensional tools created for predicting a proper size of a garment on a particular user and for both analyzing and visualizing the fit of that size garment on the user prove useful in developing custom patterns for a particular user. By using the user's body scan fit model of the user, custom-fitted garments can be created for the user.

V. CONCLUSION

The present invention is a system and method for implementing a virtual fitting room that enables accurate size prediction and analysis of fit of a garment on a user. The virtual fitting room of the present invention uses a full-body scanner to generate a cloud of over one hundred thousand data points to collectively describe the surface geometry of a body. The system then processes this data to achieve an accurate body scan fit model of the user. By gathering a broad database of such body scan fit models, the CLARITY FITTING ROOM$^{SM}$, will accurately predict the best-fitting size of a particular garment for an individual user, will analyze the resulting fit of that size garment on the individual user, and will display an accurate visualization of the garment's fit on the individual user.

Although the present invention has been described with reference to preferred embodiments, workers skilled in the art will recognize that changes may be made in form and detail without departing from the spirit and scope of the invention.

What is claimed is:

1. A method for enabling a customer to virtually try on a selected garment, the method comprising:

retrieving a mathematical model of the customer's body;

retrieving a garment model for the selected garment, the garment model including a plurality of fit factors;

determining a size of the garment that will best fit the customer, wherein size is determined by comparing the fit factors of the garment model to the mathematical model of the customer's body;

determining a fit analysis data of the selected garment in the determined size on the customer for each of the fit factors, wherein the fit analysis data is determined by comparing each of the fit factors of the determined size garment to the mathematical model of the customer's body.

2. The method of claim 1 wherein the mathematical model is derived from a three-dimensional scan data representative of a surface geometry of the customer's body.

3. The method of claim 2 wherein the scan data is obtained by performing a full body, three-dimensional scan of the customer.

4. The method of claim 2 wherein the scan data includes over one hundred thousand data points.

5. The method of claim 1 wherein the mathematical model is derived from a three-dimensional scan data representative of a surface geometry of a scan subject's body, the scan subject having body measurements and form similar to the customer.

6. The method of claim 6 and further comprising:
asking the customer a series of questions to match the customer to the scan subject.

7. The method of claim 7 wherein the series of questions includes questions regarding the customer's physical measurements and patterns of fit issues associated with off-the-rack clothing.

8. The method of claim 1 and further comprising:
creating a fit visualization model of the customer's body;
retrieving a fit visualization model of the selected garment; and
generating a visualization of the customer in the selected garment in the determined size from the fit visualization models of the customer's body and of the selected garment and the fit analysis data.

9. The method of claim 8 wherein creating a fit visualization model of the customer's body comprises:
extracting a plurality of body landmark locations and dimensions from the mathematical model of the customer's body; and
using the extracted body landmark locations and dimensions to transform a parametric visualization of a generic body into the fit visualization model of the customer.

10. The method of claim 8 wherein the fit visualization model of the selected garment is generated from garment specifications, grading rules and sizing information provided by a manufacturer of the selected garment.

11. A system for implementing a virtual fitting room that enables accurate size prediction and analysis of fit of a garment on a customer, the system comprising:
means for retrieving a mathematical model of a scan subject's body from a database of mathematical models representing a multitude of scan subjects, the mathematical model approximating a body of the customer;
means for enabling the customer to select a garment for size prediction and analysis of fit;
means for retrieving a garment model of the selected garment from a database of garment models, wherein each of the garment models includes a plurality of fit factors;
means for determining a size of the selected garment that will best fit the customer, wherein size is determined by comparing the fit factors of the garment model of the selected garment to the mathematical model of the customer's body, and wherein the determined size is a largest size required by any of the fit factors of the garment model of the selected garment; and
means for determining a fit analysis data of the selected garment in the determined size on the customer for each of the fit factors, wherein the fit analysis data is determined by comparing each of the fit factors of the determined size garment to the mathematical model of the customer's body.

12. The system of claim 11 wherein the retrieved mathematical model is derived from a three-dimensional scan data representative of a surface geometry of the customer's body.

13. The system of claim 11 wherein the retrieved mathematical model is derived from a three-dimensional scan data representative of a surface geometry of a scan subject's body, the scan subject having body measurements and form similar to the customer.

14. The system of claim 13 and further comprising:
means for asking the customer a series of questions to match the customer to the scan subject.

15. The system of claim 14 wherein the series of questions includes questions regarding the customer's physical measurements and patterns of fit issues associated with off-the-rack clothing.

16. The system of claim 11 and further comprising:
means for creating a fit visualization model of the customer's body;
means for retrieving a garment visualization model of the selected garment from a database of garment visualization models; and
means for generating a visualization of the customer in the selected garment in the determined size from the fit visualization models of the customer's body, the garment visualization model of the selected garment and the fit analysis data.

17. The system of claim 16 wherein the fit visualization model of the customer's body is created by a method comprising:
extracting a plurality of body landmark locations and dimensions from the mathematical model of the customer's body; and
using the extracted body landmark locations and dimensions to transform a parametric visualization of a generic body into the fit visualization model of the customer.

18. The system of claim 16 wherein the garment visualization model of the selected garment is generated from garment specifications, grading rules and sizing information provided by a manufacturer of the selected garment.

19. The system of claim 11 and further comprising:
means for gathering demographic information from the customer and the scan subjects.

20. The system of claim 19 and further comprising:
means for monitoring and storing the customer's browsing and purchasing behavior.

* * * * *